US006680755B2

(12) United States Patent
Shen et al.

(10) Patent No.: US 6,680,755 B2
(45) Date of Patent: Jan. 20, 2004

(54) ADJUSTABLE BIASED GAMMA-CORRECTION CIRCUIT WITH CENTRAL-SYMMETRY VOLTAGE

(75) Inventors: Yuhren Shen, Tainan (TW); Chien-Chih Chen, Tainan (TW); Ming-Daw Chen, Hsinchu (TW); Ming-Jiun Liaw, Hsinchu (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 433 days.

(21) Appl. No.: 09/826,097

(22) Filed: Apr. 5, 2001

(65) Prior Publication Data

US 2002/0145598 A1 Oct. 10, 2002

(51) Int. Cl.[7] .................................... H04N 5/202
(52) U.S. Cl. .................................... 348/674; 348/675
(58) Field of Search .................................... 348/674, 675, 348/676, 677, 254, 256; 358/519, 518; 345/590, 690, 89; H04N 5/202, 9/69

(56) References Cited

U.S. PATENT DOCUMENTS

| | | | | | |
|---|---|---|---|---|---|
| 3,633,121 | A | * | 1/1972 | Bretl | 330/283 |
| 3,790,702 | A | * | 2/1974 | Kubota et al. | 348/675 |
| 4,035,840 | A | * | 7/1977 | Teuling | 348/707 |
| 4,227,216 | A | * | 10/1980 | Blom | 348/676 |
| 4,547,797 | A | * | 10/1985 | Mick | 348/655 |
| 4,550,997 | A | * | 11/1985 | Nishi et al. | 396/251 |
| 5,526,059 | A | * | 6/1996 | Lee et al. | 348/655 |
| 6,304,255 | B1 | * | 10/2001 | Suzuki et al. | 345/211 |
| 6,549,182 | B2 | * | 4/2003 | Nitta et al. | 345/89 |

* cited by examiner

*Primary Examiner*—Michael H. Lee
*Assistant Examiner*—Trang U. Tran

(57) ABSTRACT

An adjustable biased Gamma-correction circuit with central-symmetry voltage is disclosed. The present invention provides varistors, transistors, or operation amplifiers in a Gamma-correction circuit to obtain a plurality of plus and minus symmetrical driving voltages based on a central voltage. Utilizing the present invention, a Gamma-correction circuit can generate the most adjustable driving voltages by using the minimum voltage sources.

10 Claims, 4 Drawing Sheets

ADJUSTABLE BIASED GAMMA-CORRECTION CIRCUIT WITH CENTRAL-SYMMETRY VOLTAGE

FIELD OF THE INVENTION

The present invention relates to a Gamma-correction circuit. More particularly, the present invention relates to using varistors, transistors, or operation amplifiers in a Gamma-correction circuit to obtain an adjustable based Gamma-correction circuit with central-symmetry voltage.

BACKGROUND OF THE INVENTION

In an active matrix liquid-crystal-display (AM-LCD) system, the character curve, which shows the transmittance of the liquid crystals versus the applied driving voltage in FIG. 1, is a non-linear curve. In order to obtain a linear character curve or special relation curve with the best vision effect for human eyes between transmittance of the liquid crystals and the code number, as shown in FIG. 2. The relationship between the driving voltages and the code numbers should be determined, so that the linear character curve or special relation curve with the best vision effect for human eyes between transmittance of the liquid crystals and the code number can be obtained. As shown in FIG. 3, the curve, which all the code numbers can be mapped into the specific driving voltages, is called Gamma curve.

In the AM-LCD system, the main function of the Gamma-correction circuit is to make reference to the Gamma curve for transferring the code numbers to the corresponding driving voltages, and then the driving voltages can be applied to the liquid crystals of the AM-LCD system. By using the Gamma curve, the intensity, gray level, contrast, and color performance of the LCD can be adjusted. Therefore, the Gamma curve, which is determined by the Gamma-correction circuit, is very important in the color quality of the LCD.

In the generality of cases, if the more driving reference voltages are applied by the Gamma-correction circuit, the less approximating errors to the Gamma curve can be obtained. Under the requirement of the high color performance of the display, 256 code numbers of 8-bit data should be provided, and 256 code numbers mean that the display can provide 256 gray levels. It is the optimum that 256 reference voltage sources are provided by an adjustable circuit, but it is impossible to do this. Furthermore, because the nematic liquid-crystal has the character of AC driving, 512 driving voltages, which comprise 256 plus driving reference voltages and 256 minus driving reference voltages, should be applied to the Gamma-correction circuit. Referring to FIG. 4, a conventional Gamma-correction circuit is shown. Two voltages ($V_n$ and $V_{n-1}$) are provided between a plurality of serial resistors ($R_1$~$R_m$). By adjusting the resistor value, each driving voltage ($V_{R1}$~$V_{Rm-1}$) between these two voltages ($V_n$ and $V_{n-1}$) can be obtained at each node. As shown in FIG. 1, each node is connected to a buffer, so that the output of the buffer is the driving voltage. In this way, the input voltages can be decreased by using the dividing voltage of the serial resistors.

In the AC driving circuit, as shown in FIG. 5, two input reference voltage terminals ($V_{cc}$ and $V_{Gnd}$) are serially connected a plurality of symmetrical resistor ($R_1$~$R_m$), and then the open ends of these two resistors ($R_m$) are connected to each other for forming a central voltage node. In this way, the Gamma-correction circuit has the central voltage (($V_{cc}$+$V_{Gnd}$)/2), and symmetrical driving voltages (+$V_1$, −$V_1$, +$V_2$, −$V_2$~+$V_{m-1}$, −$V_{m-1}$) based on the central voltage. Using the conventional Gamma-correction circuit, it is very easy to obtain the driving voltages. However, it is very difficult to obtain the symmetrical driving voltages and the central voltage when they need to be adjusted, because all the driving voltages will be affected when one of the serial resistors is changed. Furthermore, the non-symmetrical driving voltages will induce the flicker phenomena of image, and make the poor image quality.

Due to the requirement of the high color performance of the display, it is necessary to have an exact Gamma curve. In order to approximate the Gamma curve, the number of the driving reference voltages should be increased. Therefore, a Gamma-correction circuit, which can generate the most adjustable driving reference voltages by using the minimum voltage sources, is necessary.

SUMMARY OF THE INVENTION

It is therefore an object of this invention to provide an adjustable based Gamma-correction circuit with central-symmetry voltage. The present invention provides varistors, transistors, or operation amplifiers in a Gamma-correction circuit to obtain a plurality of plus and minus symmetrical driving voltages based on a central voltage.

It is another object of this invention to provide an adjustable based Gamma-correction circuit with central-symmetry voltage. Utilizing the present invention, a Gamma-correction circuit can generate the most adjustable driving voltages by using the minimum voltage sources.

In accordance with all aspects of this invention, the invention provides an adjustable based Gamma-correction circuit, comprising: a plurality of symmetrical dividing voltage units, each symmetrical dividing voltage unit including a serial connection of a first resistor, a resistor value control circuit, and a second resistor between a first input terminal and a second input terminal, an input of a first buffer connected at a first end of the resistor value control circuit, and an input of a second buffer connected at a second end of the resistor value control circuit for respectively generating a pair of the plus driving voltage and the minus driving voltage from an output of the first buffer and an output of the second buffer, and wherein the output of the first buffer and the output of the second buffer of each symmetrical dividing voltage unit are respectively connected to the first input terminal and the second input terminal of the next symmetrical dividiespectively connected to a first voltage and a second voltage.

In accordance with all aspects of this invention, this invention provides an adjustable based Gamma-correction circuit, comprising: a plurality of symmetrical dividing voltage units, each symmetrical dividing voltage unit including a varitor having a drawing terminal connected between an input terminal and a first voltage, a first amplifier having the drawing terminal connected to a plus input of the first amplifier and a minus input of the first amplifier connected to an output of the first amplifier, a second amplifier having a first resistor connected between the minus input of the first amplifier and a minus input of the second amplifier and a second resistor connected between the minus input of the second amplifier and an output of the second amplifier and the central voltage connected to a plus input of the second amplifier for respectively generating a pair of the plus driving voltage and the minus driving voltage from the output of the first amplifier and the output of the second amplifier, and wherein the output of the first amplifier of each symmetrical dividing voltage unit is connected to the input terminal of the next symmetrical dividing voltage unit, and the first input terminal is connected to a second voltage.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
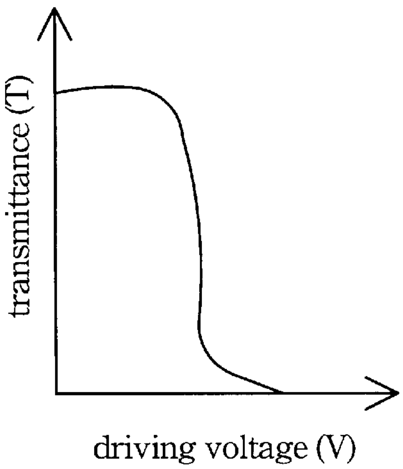
FIG. 1 (PRIOR ART)
FIG. 1 is a diagram, showing the transmittance of the liquid crystals versus the applied driving voltage.
Figure 2:
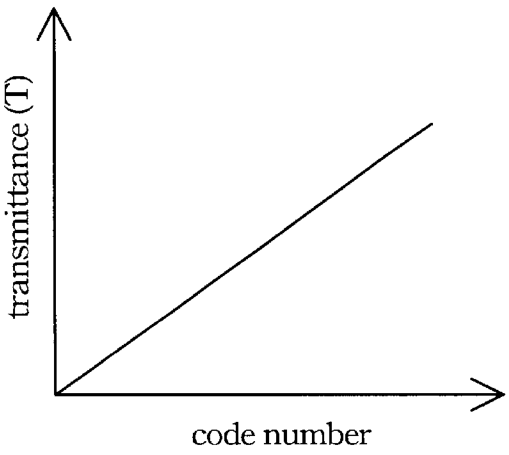
FIG. 2 (PRIOR ART)
FIG. 2 is a diagram, showing the linear relation case of the transmittance of the liquid crystals versus the code number.
Figure 3:
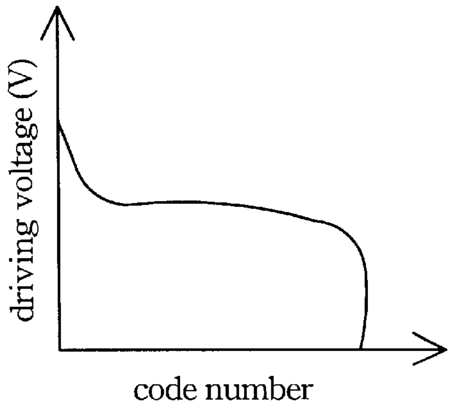
FIG. 3 (PRIOR ART)
FIG. 3 is a diagram, showing the gamma curve of transmittance of the liquid crystals versus the code number.
Figure 4:
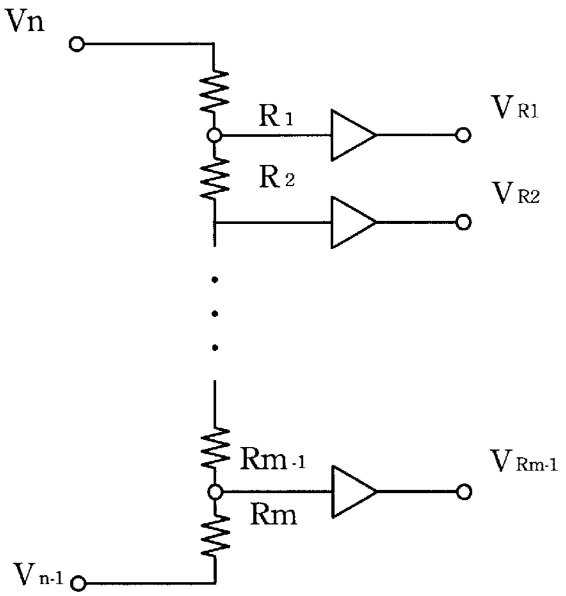
FIG. 4 (PRIOR ART)
FIG. 4 is a schematic diagram, showing the conventional Gamma-correction circuit with fixed ratio resistors.
Figure 5:
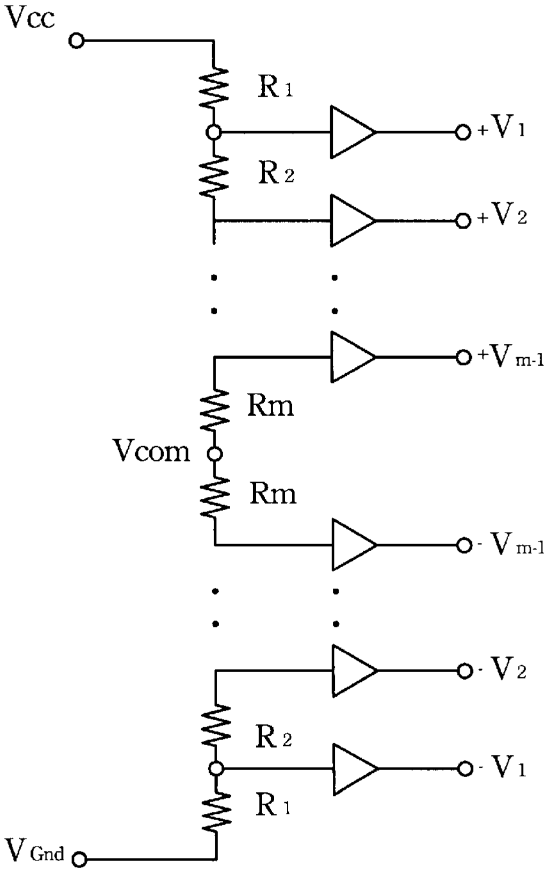
FIG. 5 (PRIOR ART)
FIG. 5 is a schematic diagram, showing the conventional Gamma-correction circuit used in an AC driving system.
Figure 6:
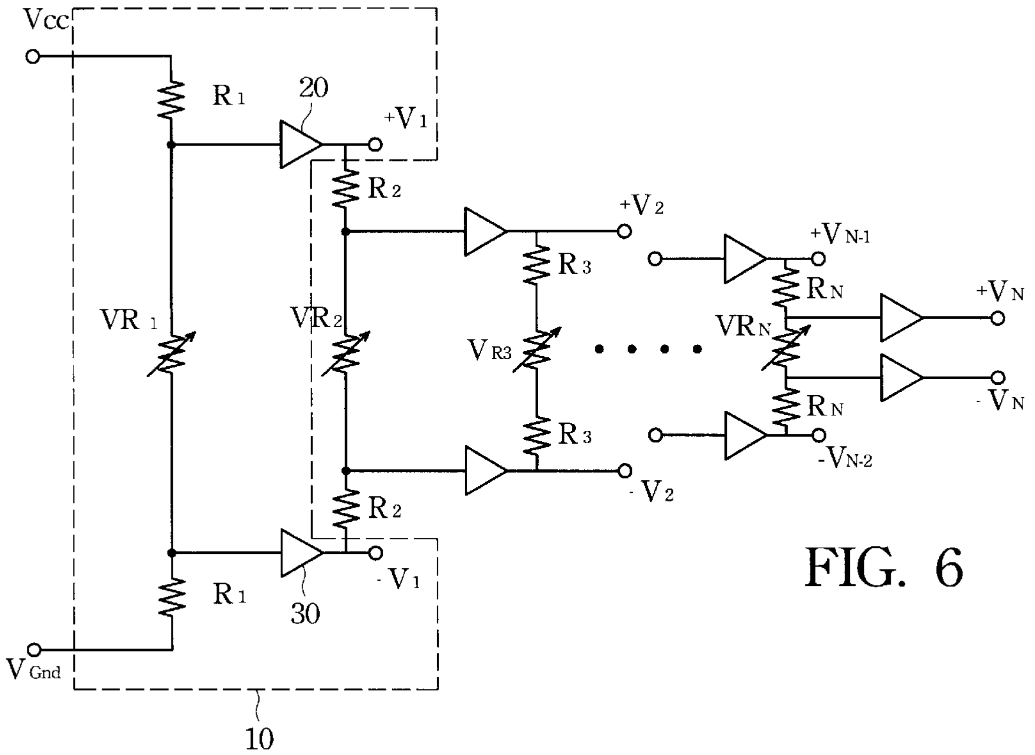
FIG. 6 is a schematic diagram, showing the first embodiment of the Gamma-correction circuit.

Referring to FIG. 6, the schematic diagram shows the Gamma-correction circuit of the first embodiment of the present invention. The connections of the Gamma-correction circuit are described as follows.

The Gamma-correction circuit consists a plurality of symmetrical dividing voltage units 10. In the first symmetrical dividing voltage unit 10, a resistor ($R_1$), a varistor ($VR_1$), and a resistor ($R_1$) are serially connected between two input terminals, which are connected respectively to the voltage sources ($V_{cc}$ and $V_{Gnd}$). Two buffers 20 and 30 are connected respectively to two ends of the varistor ($VR_1$) for outputting the voltages from these two ends of the varistor ($VR_1$). Moreover, these two input terminals of the next symmetrical dividing voltage unit are connected to these two outputs of the forward buffers. In this way, the Gamma-correction circuit of the first embodiment of the present invention, which includes a first symmetrical dividing voltage unit 10, a second symmetrical dividing voltage unit, . . . , and an (N)th symmetrical dividing voltage unit, is completed.

As shown in FIG. 6, it is obvious that the central voltage of the Gamma-correction circuit is $(V_{cc}+V_{Gnd})/2$. Due to these two resistor have the same resistor value, the outputs of these two buffers 20 and 30, which denote $+V_1$ (plus driving voltage) and $-V_1$ (minus driving voltage), are symmetrical based on the central voltage in the first symmetrical dividing voltage unit 10 no matter how the varistor ($VR_1$) is adjusted. In the same way as described above, other symmetrical dividing voltage units can generate the symmetrical sequential-decrease plus driving voltage ($+V_2$~$+V_N$) and sequential-increase minus driving voltage ($-V_2$~$-V_N$). By adjusting the resistor value of the varistor in each symmetrical dividing voltage unit, all the calibrated plus driving voltage ($+V_2$~$+V_N$) and minus driving voltage ($-V_2$~$-V_N$) can be obtained, and the pairs of the plus and minus driving voltages are symmetrical based on the central voltage. Furthermore, the central voltage will not shift when the varistors are adjusted. Also, the driving voltages of the Gamma-correction circuit can be approached the Gamma curve by increasing the number of the symmetrical dividing voltage units.

Figure 7:
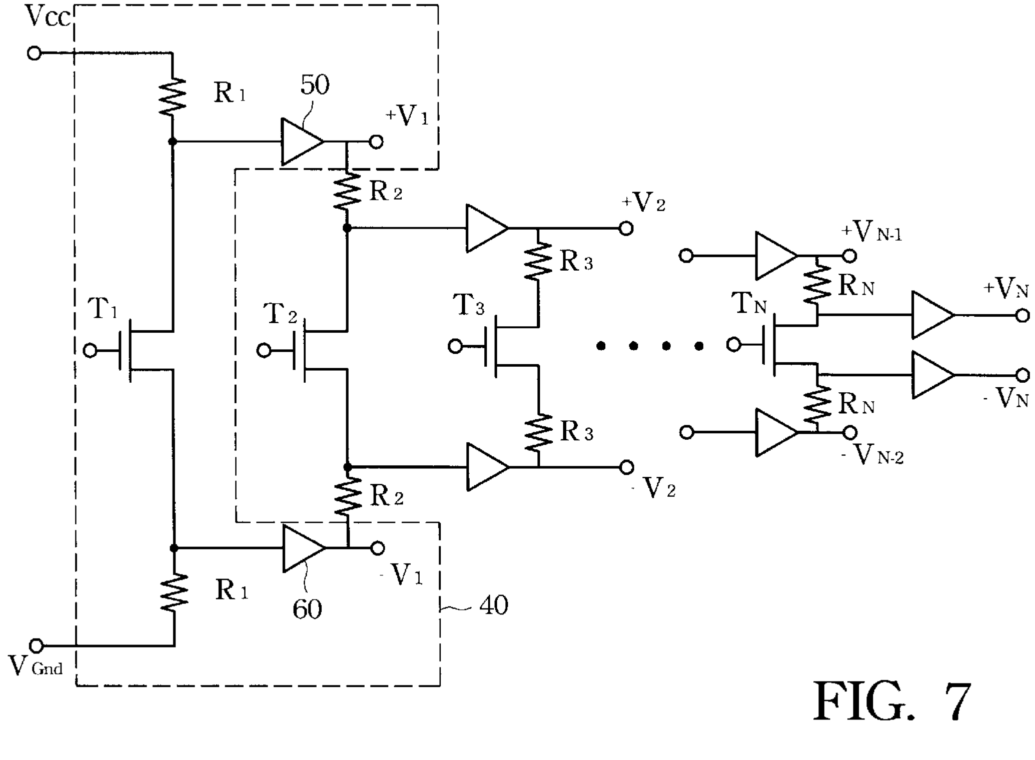
FIG. 7 is a schematic diagram, showing the second embodiment of the Gamma-correction circuit.

Referring to FIG. 7, the schematic diagram shows the Gamma-correction circuit of the second embodiment of the present invention. The connection-ship of the Gamma-correction circuit is described as follows.

The Gamma-correction circuit consists a plurality of symmetrical dividing voltage unit 40. In the first symmetrical dividing voltage unit 40, a resistor ($R_1$), a source and a drain of a field effect transistor (FET) ($T_1$), and a resistor ($R_1$) are serially connected between two input terminals, which are connected respectively to the voltage sources ($V_{cc}$ and $V_{Gnd}$). Two buffers 50 and 60 are connected respectively to the source and the drain of the FET ($T_1$) for outputting the voltages from the source and the drain terminals. Moreover, these two input terminals of the next symmetrical dividing voltage unit are connected to these two outputs of the forward buffers. In this way, the Gamma-correction circuit of the second embodiment of the present invention, which includes a first symmetrical dividing voltage unit 40, a second symmetrical dividing voltage unit, . . . , and an (N)th symmetrical dividing voltage unit, is completed.

As shown in FIG. 7, the FET in each symmetrical dividing voltage unit can be treated as having an internal resistor between the source and the drain terminals, and the resistor value of the internal resistor can be controlled by adjusting a gate voltage of the FET. In the same way as the first embodiment, all the symmetrical dividing voltage units can generate the symmetrical sequential-decrease plus driving voltage ($+V_1$~$+V_N$) and sequential-increase minus driving voltage ($-V_1$~$-V_N$). By adjusting the voltage of the gate to obtain an adjusted internal resistor, all the calibrated plus driving voltage ($+V_1$~$+V_N$) and minus driving voltage ($-V_1$~$-V_N$) can be obtained, and the pairs of the plus and minus driving voltages are symmetrical based on the central voltage.

Figure 8:
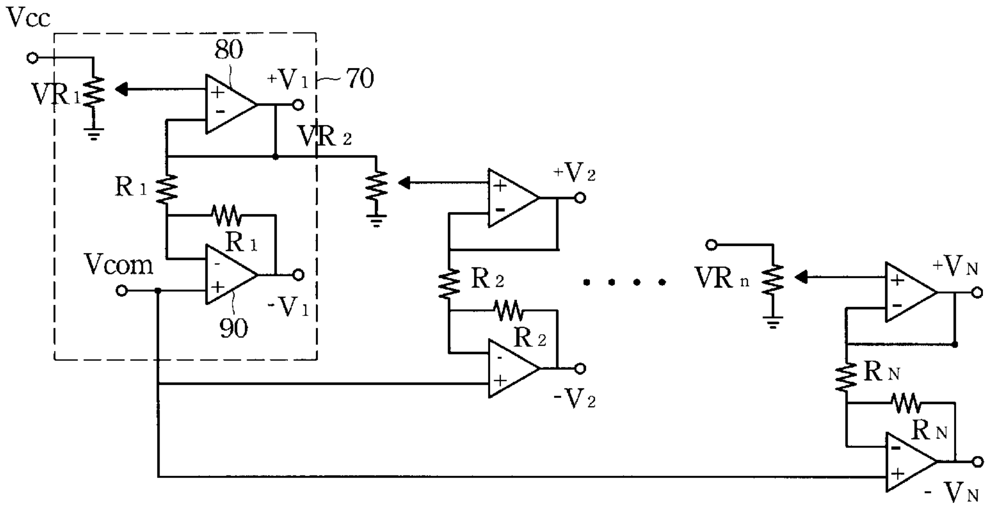
FIG. 8 is a schematic diagram, showing the third embodiment of the Gamma-correction circuit.

Referring to FIG. 8, the schematic diagram shows the Gamma-correction circuit of the third embodiment of the present invention. The connection-ship of the Gamma-correction circuit is described as follows.

The Gamma-correction circuit consists a plurality of symmetrical dividing voltage unit 70. Each symmetrical dividing voltage unit 70 has the same connection and comprises a varistor having a drawing terminal, two resistors with the same resistor value, and two operation amplifiers. The varistor ($VR_1$) of the first symmetrical dividing voltage unit 70 is connected between an input terminal, which is connected to a voltage source ($V_{cc}$ and $V_{Gnd}$). The plus input of the first operation amplifier 80 is connected to the drawing terminal of the varistor ($VR_1$), and the minus input of the first operation amplifier 80 is connected to the output of the first operation amplifier 80. A central voltage ($V_{com}$) is connected to the plus input of the second operation amplifier 90, a resistor ($R_1$) is connected between these two minus inputs of the first operation amplifier 80 and the second operation amplifier 90, and another resistor ($R_1$) is connected between the minus inputs and the output of the second operation amplifier 90. Moreover, the input terminal of the next symmetrical dividing voltage unit is connected to the output of the forward first operation amplifier. In this way, the Gamma-correction circuit of the third embodiment of the present invention, which includes a first symmetrical dividing voltage unit 70, a second symmetrical dividing voltage unit, . . . , and an (N)th symmetrical dividing voltage unit, is completed.

As shown in FIG. 8, it is obvious that the central voltage of the Gamma-correction circuit is $V_{com}$. Due to these two resistors have the same resistor value, the outputs of these two amplifiers 80 and 90, which denote $+V_1$ (plus driving voltage) and $-V_1$ (minus driving voltage), are symmetrical based on the central voltage ($V_{com}$) in the first symmetrical dividing voltage unit 70 no matter how the varistor ($VR_1$) is adjusted. In the same way as described above, other symmetrical dividing voltage units can generate the symmetrical sequential-decrease plus driving voltage ($+V_2$~$+V_N$) and sequential-increase minus driving voltage ($-V_2$~$-V_N$). By adjusting the position of the drawing terminal of the varistor in each symmetrical dividing voltage unit, all the calibrated plus driving voltage ($+V_2$~$+V_N$) and minus driving voltage ($-V_2$~$-V_N$) can be obtained, and the pairs of the plus and minus driving voltages are symmetrical based on the central voltage ($V_{com}$). Furthermore, the central voltage ($V_{com}$) will not shift when the varistors are adjusted. Also, the driving voltages of the Gamma-correction circuit can approach the Gamma curve by increasing the number of the symmetrical dividing voltage units.

Figure 9:
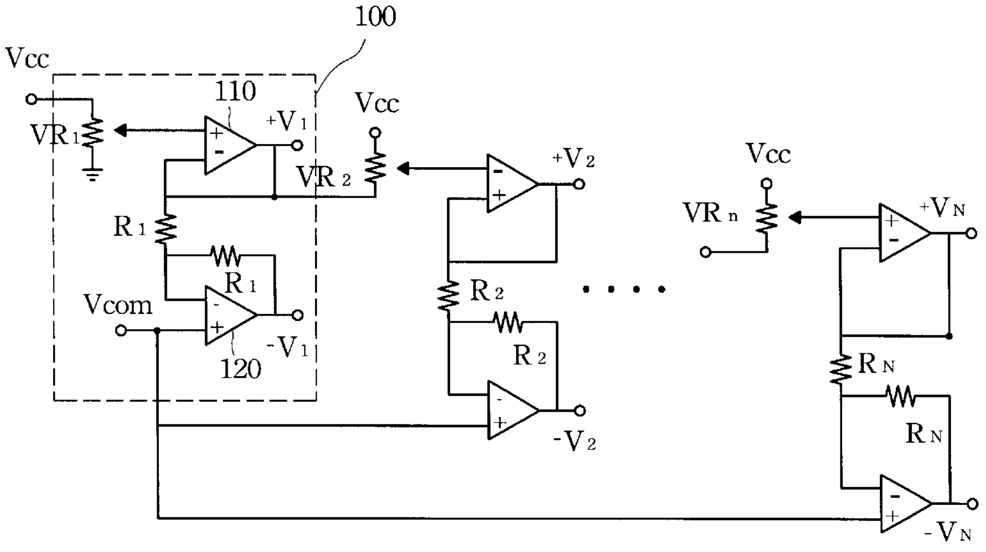
FIG. 9 is a schematic diagram, showing the fourth embodiment of the Gamma-correction circuit.

Referring to FIG. 9, the schematic diagram shows the Gamma-correction circuit of the fourth embodiment of the present invention. The connection-ship of the Gamma-correction circuit is described as follows.

The connection differences between the fourth embodiment and the third embodiment are that each varistor of the symmetrical dividing voltage unit 100 is connected between an input terminal and a voltage source ($V_{cc}$). In the first symmetrical dividing voltage unit 100, the input terminal is connected to ground. According to the fourth embodiment, the outputs of these two amplifiers 110 and 120, which denote $+V_1$ (plus driving voltage) and $-V_1$ (minus driving voltage), are symmetrical based on the central voltage ($V_{com}$). In the same way, other symmetrical dividing voltage units can generate the symmetrical sequential-increase plus driving voltage ($+V_2$~$+V_N$) and sequential-decrease minus driving voltage ($-V_2$~$-V_N$). Consequently, the output difference between the fourth embodiment and the third embodiment is that the plus driving voltage of the symmetrical dividing voltage unit is higher than that of the next symmetrical dividing voltage unit in the third embodiment, and the plus driving voltage of the symmetrical dividing voltage unit is lower than that of the next symmetrical dividing voltage unit in the fourth embodiment.

It is therefore an advantage of this invention to provide an adjustable based Gamma-correction circuit with central-symmetry voltage. The present invention provides varistors, transistors, or operation amplifiers in a Gamma-correction circuit to obtain a plurality of sequential changing plus and minus symmetrical driving voltages based on a central voltage.

It is another advantage of this invention to provide an adjustable based Gamma-correction circuit with central-symmetry voltage. Utilizing the present invention, a Gamma-correction circuit can generate the most adjustable driving voltages by using the minimum voltage sources.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. An adjustable biased Gamma-correction circuit for the purpose of forming a plurality of plus and minus driving voltages based on a central voltage, comprising:

a plurality of symmetrical dividing voltage units, each symmetrical dividing voltage unit including a serial connection of a first resistor having a resistor value, a varistor, and a second resistor having said resistor value between a first input terminal and a second input terminal, an input of a first buffer connected at a first end of said varistor, and an input of a second buffer connected at a second end of said varistor for respectively generating a pair of said plus driving voltage and said minus driving voltage from an output of said first buffer and an output of said second buffer; and wherein said output of said first buffer and said output of said second buffer of each symmetrical dividing voltage unit are connected respectively to said first input terminal and said second input terminal of said next symmetrical dividing voltage unit, and said first input terminal and said second input terminal of said first symmetrical dividing voltage unit are connected respectively to a first voltage and a second voltage.

2. An adjustable biased Gamma-correction circuit for the purpose of forming a plurality of plus and minus driving voltages based on a central voltage, comprising:

a plurality of symmetrical dividing voltage units, each symmetrical dividing voltage unit including a serial connection of a first resistor having a resistor value, a resistor value control circuit, and a second resistor having said resistor value between a first input terminal and a second input terminal, an input of a first buffer connected at a first end of said resistor value control circuit, and an input of a second buffer connected at a second end of said resistor value control circuit for respectively generating a pair of said plus driving voltage and said minus driving voltage from an output of said first buffer and an output of said second buffer; and wherein said output of said first buffer and said output of said second buffer of each symmetrical dividing voltage unit are respectively connected to said first input terminal and said second input terminal of said next symmetrical dividing voltage unit, and said first input terminal and said second input terminal of said first symmetrical dividing voltage unit are respectively connected to a first voltage and a second voltage.

3. The circuit according to claim 2, wherein a control terminal of said resistor value control circuit can change a resistance value connected between said first resistor and said second resistor.

4. The circuit according to claim 3, wherein said resistor value control circuit is a field effect transistor, and a drain of said field effect transistor is connected to said input of said first buffer, a source of said field effect transistor is connected to said input of said second buffer, and a gate of said field effect transistor is said control terminal for controlling said resistor value between said source and said drain.

5. The circuit according to claim 3, wherein said resistor value control circuit is a field effect transistor, and a source of said field effect transistor is connected to said input of said first buffer, a drain of said field effect transistor is connected to said input of said second buffer, and a gate of said field effect transistor is said control terminal for controlling said resistor value between said source and said drain.

6. An adjustable biased Gamma-correction circuit for the purpose of forming a plurality of plus and minus driving voltages based on a central voltage, comprising:

a plurality of symmetrical dividing voltage units, each symmetrical dividing voltage unit including a varitor having a drawing terminal connected between an input terminal and a first voltage, a first amplifier having said drawing terminal connected to a plus input of said first amplifier and a minus input of said first amplifier connected to an output of said first amplifier, a second amplifier having a first resistor having a resistor value connected between said minus input of said first amplifier and a minus input of said second amplifier and a second resistor having said resistor value connected between said minus input of said second amplifier and an output of said second amplifier and said central voltage connected to a plus input of said second amplifier for respectively generating a pair of said plus driving voltage and said minus driving voltage from said output of said first amplifier and said output of said second amplifier; and wherein said output of said first amplifier of each symmetrical dividing voltage unit is connected to said input terminal of said next symmetrical dividing voltage unit, and said first input terminal is connected to a second voltage.

7. The circuit according to claim 6, wherein said first amplifier is an operation amplifier.

8. The circuit according to claim 6, wherein said second amplifier is an operation amplifier.

9. The circuit according to claim 6, wherein said first voltage is a voltage source and said second voltage is a ground voltage.

10. The circuit according to claim 6, wherein said first voltage is a ground voltage and said second voltage is a voltage source.

* * * * *